(12) United States Patent
Sohn et al.

(10) Patent No.: US 7,991,057 B2
(45) Date of Patent: Aug. 2, 2011

(54) APPARATUS AND METHOD FOR GENERATING RANGING PSEUDO NOISE CODE

(75) Inventors: Kyung-Yeol Sohn, Daejeon (KR); Youn-Ok Park, Daejeon (KR)

(73) Assignees: Samsung Electronics Co., LTd. (KR); Electronics and Telecommunications Research Institute (KR); KT Corporation (KR); SK Telecom Co., Ltd. (KR); KTFreetel Co. Ltd. (KR); Hanaro Telecom., Inc. (KR)

( * ) Notice: Subject to any disclaimer, the term of this patent is extended or adjusted under 35 U.S.C. 154(b) by 775 days.

(21) Appl. No.: 11/667,884

(22) PCT Filed: Sep. 7, 2005

(86) PCT No.: PCT/KR2005/002952
§ 371 (c)(1),
(2), (4) Date: May 16, 2007

(87) PCT Pub. No.: WO2006/054825
PCT Pub. Date: May 26, 2006

(65) Prior Publication Data
US 2007/0291861 A1 Dec. 20, 2007

(30) Foreign Application Priority Data

Nov. 19, 2004 (KR) .......................... 10-2004-0095038

(51) Int. Cl.
*H04K 1/10* (2006.01)
*H04L 27/28* (2006.01)
*H04L 27/00* (2006.01)

(52) U.S. Cl. .......................................... 375/260; 375/259
(58) Field of Classification Search .................. 375/259, 375/260
See application file for complete search history.

(56) References Cited

U.S. PATENT DOCUMENTS

| 6,339,781 | B1 | 1/2002 | Sasaki |
| 6,442,152 | B1* | 8/2002 | Park et al. ................ 370/341 |
| 6,556,555 | B1 | 4/2003 | Miller et al. |
| 6,714,597 | B1* | 3/2004 | Antonio et al. ............. 375/296 |
| 6,834,190 | B1* | 12/2004 | Lee et al. .................. 455/436 |
| 7,123,895 | B2* | 10/2006 | Greenspan et al. .......... 455/311 |
| 7,398,287 | B2* | 7/2008 | An ......................... 708/252 |

(Continued)

FOREIGN PATENT DOCUMENTS

KR 1020020084915 11/2002

(Continued)

*Primary Examiner* — Dac V Ha
*Assistant Examiner* — Erin M File
(74) *Attorney, Agent, or Firm* — The Farrell Law Firm, P.C.

(57) ABSTRACT

Disclosed is an apparatus for generating a ranging pseudo noise code used for a terminal of a portable internet system of an OFDM access scheme. The apparatus for generating ranging pseudo noise code detects a cell ID number using a preamble signal transmitted from a base station covering the terminal, detects a ranging pseudo noise code mask value using the detected cell ID number and system parameters input from the base station, and generates a ranging pseudo noise code using the detected cell ID number and the ranging pseudo noise code mask value. With the above structure, a constant initial value can be used irregardless of the cell ID number of the base station, and a desired ranging pseudo noise code can be generated as fast as possible so as to have a desired offset.

8 Claims, 4 Drawing Sheets

U.S. PATENT DOCUMENTS

| | | | |
|---|---|---|---|
| 2002/0048315 A1* | 4/2002 | Hanada et al. | 375/145 |
| 2003/0002566 A1* | 1/2003 | McDonough et al. | 375/147 |
| 2003/0198179 A1 | 10/2003 | Koo et al. | |
| 2004/0090907 A1* | 5/2004 | An | 370/208 |
| 2004/0179579 A1* | 9/2004 | Denk | 375/130 |
| 2005/0111522 A1* | 5/2005 | Sung et al. | 375/145 |
| 2005/0281231 A1* | 12/2005 | Kwon et al. | 370/335 |
| 2006/0031745 A1* | 2/2006 | Kim et al. | 714/801 |
| 2007/0177682 A1* | 8/2007 | Han et al. | 375/260 |
| 2009/0213833 A1* | 8/2009 | Cai et al. | 370/350 |

FOREIGN PATENT DOCUMENTS

| | | |
|---|---|---|
| KR | 1020020094108 | 12/2002 |
| WO | WO 00/27043 | 5/2000 |

* cited by examiner

APPARATUS AND METHOD FOR GENERATING RANGING PSEUDO NOISE CODE

TECHNICAL FIELD

The present invention relates to a wireless portable Internet system, and more particularly, to an apparatus for generating a ranging pseudo noise code (hereinafter called a PN code) used for a terminal of a wireless portable Internet system of an orthogonal frequency division multiple access (OFDMA) scheme.

BACKGROUND ART

Typically, for a physical layer of a portable internet system of an OFDMA scheme, four ranging modes are defined, such as initial ranging, periodic ranging, hand-off ranging, and bandwidth request ranging. The bandwidth request ranging mode is used for a terminal to request a bandwidth to a base station, and all other ranging modes are used for a power control and an uplink synchronization acquisition between the terminal and the base station.

In addition, the ranging modes are used to allow the ranging PN code signal to be output simultaneously from a plurality of terminals, and selectively for each terminal depending on its operation.

On the other hand, the ranging PN code used for a portable internet system of the OFDMA scheme is generated by a characteristic polynomial as shown in Equation 1, and the number of ranging PN code symbols available in each ranging mode is determined at the time of establishing an initial system.

$$G(x)=x^{15}+x^7+x^4+x+1 \qquad \text{(Equation 1)}$$

The ranging PN code generator applies different initialization codes for different cells using cell ID numbers which are expressed as a combination of "00101011" and 7 bits (i.e., [s6:s0]).

For example, for the 144-bit-long ranging PN code, 256 ranging PN codes in total may be used for the whole ranging modes, and such ranging PN codes may be generated as follows.

Firstly, one long sequence generated through first to (144*(K mod 256))-th clock outputs of the ranging PN code generator is equally divided into K number of 144-bit-long codes, and they are used as symbols for the initial ranging mode.

Another long sequence is generated through (144*(K mod 256)+1)-th to (144*((K+L) mod 256))-th clock outputs of the ranging PN code generator, and it is equally divided into L number of 144-bit-long codes for usage as symbols for the hand-off ranging mode.

In addition, another long sequence is generated through (144*((K+L) mod 256)+1)-th to (144*((K+L+M) mod 256))-th clock outputs of the ranging PN code generator, and it is equally divided into M number of 144-bit-long codes for usage as symbols for the periodic ranging mode.

Finally, another long sequence is generated through (144*((K+L+M) mod 256)+1)-th to (144*((K+L+M+N) mod 256))-th clock outputs of the ranging PN code generator, and it is equally divided into N number of 144-bit-long codes for usage as symbols for the bandwidth request ranging mode.

Conventionally, an apparatus for generating ranging PN code of a simple shift register generator (SSRG) scheme is used for the generation of such ranging PN codes.

FIG. 1 illustrates a schematic diagram of an apparatus for generating ranging PN codes of an SSRG scheme used for a wireless portable Internet system.

As shown in FIG. 1, a ranging PN code generator having an initial value (seed) of [0, 0, 1, 0, 1, 0, 1, 1, s0, s1, s2, s3, s4, s5, s6] generates a ranging PN code having a (144*A)-bit offset when receiving (144*A)-numbered clock signals corresponding to the offset information. Therefore, the apparatus for generating ranging PN codes of an SSRG scheme shows a drawback of consuming a significant amount of time to produce a desired result when a required offset value is high.

The ranging PN code used by a terminal is selected randomly within a range determined by a system with respect to respective ranging modes.

In summary, an apparatus for generating a ranging PN code of an SSRG scheme shows a drawback of needing a significant amount of memory in that it generates a desired ranging PN code at each offset by an application of clock signal thereto or it stores every possible state value thereof to generate the ranging PN code in response to cell ID numbers of all base station that a terminal can access.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

DISCLOSURE OF INVENTION

Technical Problem

The present invention has been made in an effort to provide an apparatus and method for generating a ranging PN code used for a terminal of a wireless portable Internet system, of an OFDMA scheme having advantages of using a constant initial value irregardless of cell ID numbers of base stations, and simultaneously having a desired offset value appropriate for a ranging mode.

Technical Solution

An exemplary apparatus and method for generating a ranging PN code according to an embodiment of the present invention includes a cell ID number search unit, a ranging pseudo noise code mask value generator, and a ranging pseudo noise code generator. The cell ID number search unit detects a cell ID number of a base station covering the terminal through a preamble signal transmitted from the base station, the ranging pseudo noise code mask value generator generates a ranging pseudo noise code mask value using the cell ID number detected by the cell ID number search unit and system parameter so as to have an offset value appropriate for a ranging mode, and a ranging pseudo noise code generator generates a ranging pseudo noise code using the cell ID number and the ranging pseudo noise code mask value.

The ranging pseudo noise code generator may be in the form of a modular shift register generator (MSRG), and use a constant initial value irregardless of the ranging mode.

In a further embodiment, a method for generating a ranging pseudo noise code is used for a terminal of a portable internet system of an OFDM access scheme.

A cell ID number is used using a preamble signal transmitted from a base station covering the terminal, a ranging pseudo noise code mask value is generated using the detected cell ID number and system parameter input from the base station, and a modulo-2 addition is performed for a initial value including the detected cell ID number and the ranging pseudo noise code mask value to generate a ranging pseudo noise code.

The system parameter includes the number of the ranging code appropriate for a ranging mode, and the ranging pseudo noise code mask value is generated depending on an offset value corresponding to the number of the ranging code.

BEST MODE FOR CARRYING OUT THE INVENTION

Figure 1:
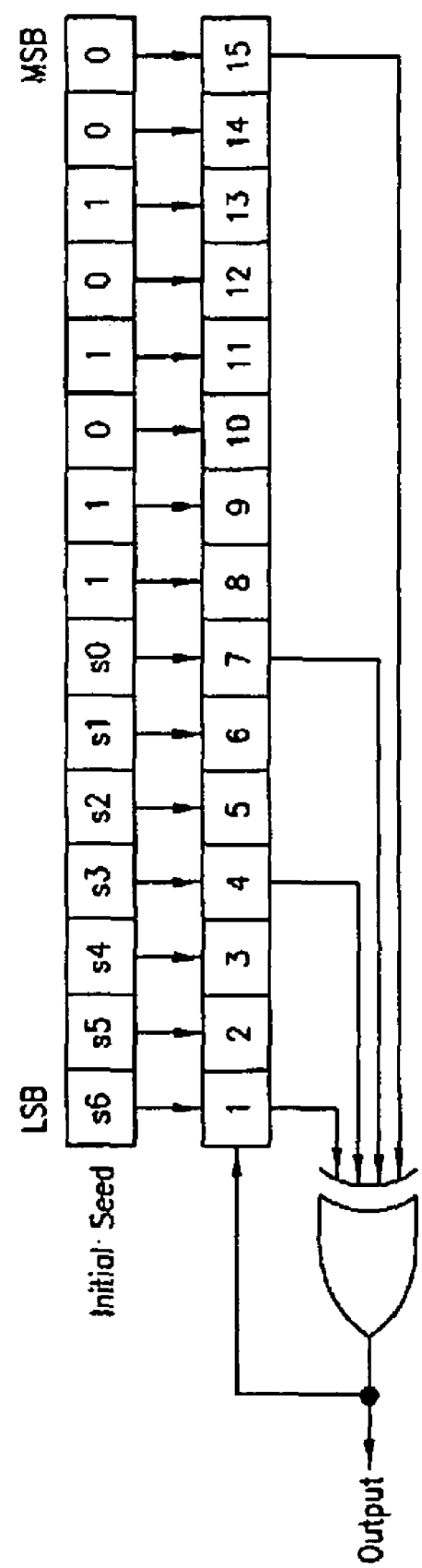
FIG. 1 is a schematic diagram of a ranging PN code generator used for a portable internet system of an SSRG (Simple Shift Register Generator) scheme.

An embodiment of the present invention will hereinafter be described in detail with reference to the accompanying drawings. In the following detailed description, only certain exemplary embodiments of the present invention have been shown and described, simply by way of illustration. Accordingly, the drawings and description are to be regarded as illustrative in nature and not restrictive. Like reference numerals designate like elements throughout the specification.

Firstly, an apparatus for generating a ranging PN code according to an embodiment of the present invention will described in detail with reference to FIG. 2. The apparatus for generating a ranging PN code is used for a terminal of a portable internet system of an OFDMA scheme.

Figure 2:
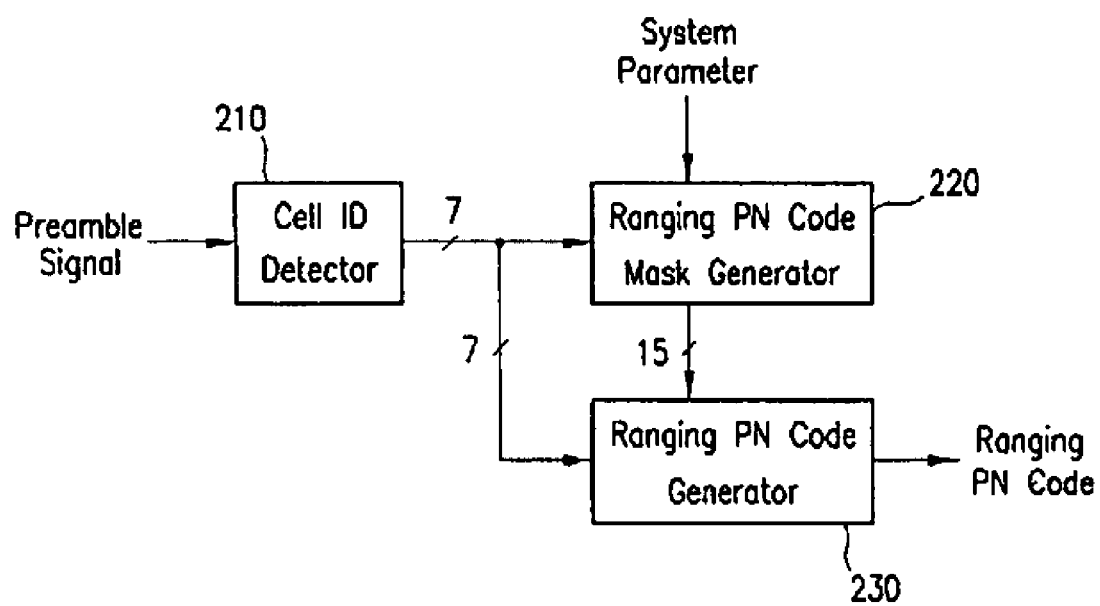
FIG. 2 is a block diagram of an apparatus for generating a ranging PN code used for a terminal of a portable internet system according to an embodiment of the present invention.

FIG. 2 is a block diagram of an apparatus for generating a ranging PN code used for a terminal of a portable internet system according to an embodiment of the present invention.

As shown in FIG. 2, the apparatus for generating a ranging PN code includes a cell ID number search unit 210, a ranging PN code mask value generator 220, and a ranging PN code generator 230.

The cell ID number search unit 210 searches a cell ID number of a base station covering a corresponding terminal, using a preamble signal transmitted from the base station, and the ranging PN code mask value generator 220 detects a mask value having an offset appropriate for ranging modes, using the cell ID number and system parameter provided by the base station.

The ranging PN code generator 230 is in the form of an MSRG (Modular Shift Register Generator), and generates a ranging PN code using the cell ID number and the ranging PN code mask value.

In more detail, the cell ID number search unit 210 receives the preamble signal from the base station, and detects the 7-bit cell ID number of the base station covering the corresponding terminal through the preamble signal.

The ranging PN code mask value generator 220 obtains the 15-bit ranging PN code mask value having an offset appropriate for the corresponding ranging mode, using system parameters and the 7-bit cell ID number output from the cell ID number search unit 210.

The ranging PN code generator 230 generates a ranging PN code using the 7-bit cell ID number output from the cell ID number search unit 210 and the 15-bit ranging PN code mask value output from the ranging PN code mask value generator 220 to output the ranging PN code.

Figure 3:
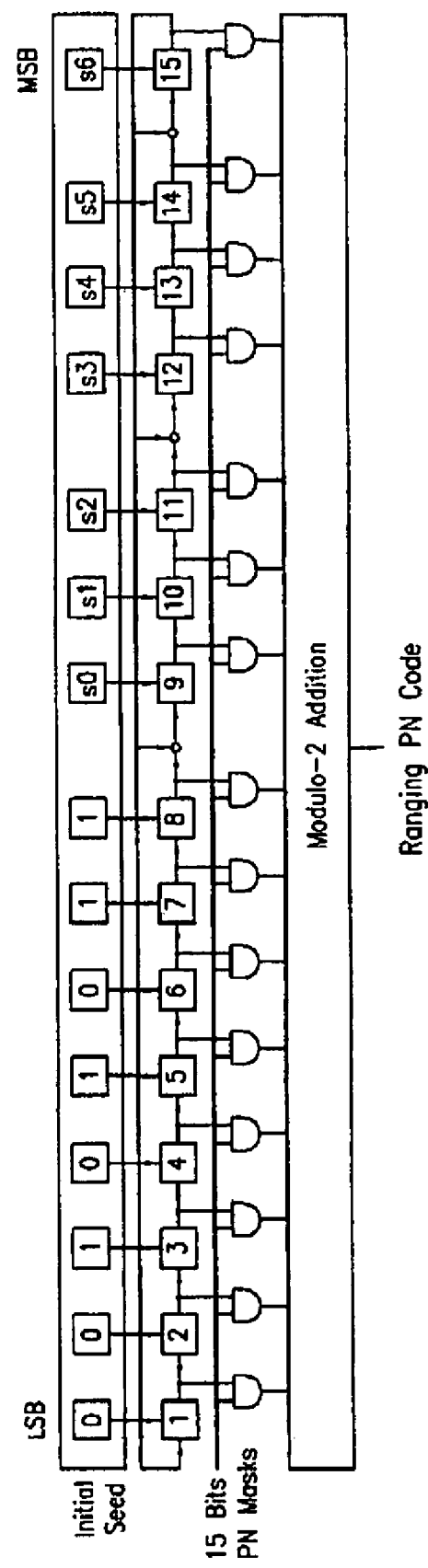
FIG. 3 is a schematic diagram of a ranging PN code generator in the form of an MSRG (Modular Shift Register Generator) according to an embodiment of the present invention.

FIG. 3 is a schematic diagram of a ranging PN code generator in the form of an MSRG (Modular Shift Register Generator) according to an embodiment of the present invention.

As shown in FIG. 3, the ranging PN code generator 230 according to an embodiment of the present invention uses a conventional PN mask value scheme, and also uses a reciprocal polynomial of Equation 1 as a characteristic polynomial for generating a ranging PN code.

In the other words, the PN code generator 230 generates the ranging PN code, using the following Equation 2.

$$F(x) = x^{15} + x^{14} + x^{11} + x^6 + 1 \quad \text{(Equation 2)}$$

In this case, the ranging PN code generator 230 uses an initial value (seed) [s6,s5,s4,s3,s2,s1,s0,1,1,0,1,0,1,0,0] that the low-order-bit of the initial value [0,0,1,0,1,0,1,1,s0,s1,s2, s3,s4,s5,s6] used for an SSRG-based ranging PN code generator of FIG. 1 is inverted to a high-order-bit.

For example, when the cell ID number search unit 210 obtains a cell ID number [0,0,0,0,0,0,0] and the ranging PN code mask value generator 220 obtains a mask value [1,0,1, 1,0,0,1,0,0,1,0,0,0,1,1], the ranging PN code generator 230 sets the initial seed [0,0,0,0,0,0,0,1,1,0,1,0,1,0,0], mask values the initial value [0,0,0,0,0,0,0,1,1,0,1,0,1,0,0] using the mask value [1,0,1,1,0,0,1,0,0,1,0,0,0,1,1] and receives 144-numbered clock signals, thereby obtaining a 144-bit-long ranging PN code with offset 0, in the same manner as an SSRG-based ranging PN code generator of FIG. 1.

Also, so as to obtain a ranging PN code corresponding to the K, L, M, and N numbered offsets given as system parameters based on four ranging modes, such as initial ranging, periodic ranging, hand-off ranging, and bandwidth request ranging appropriate for its operation, a modulo-2 addition is performed for the constant initial value of the ranging PN code generator 230, and the mask value obtained by the ranging PN code mask value generator 220 corresponding to the desired offset and 144-numbered clock signals are applied.

Figure 4:
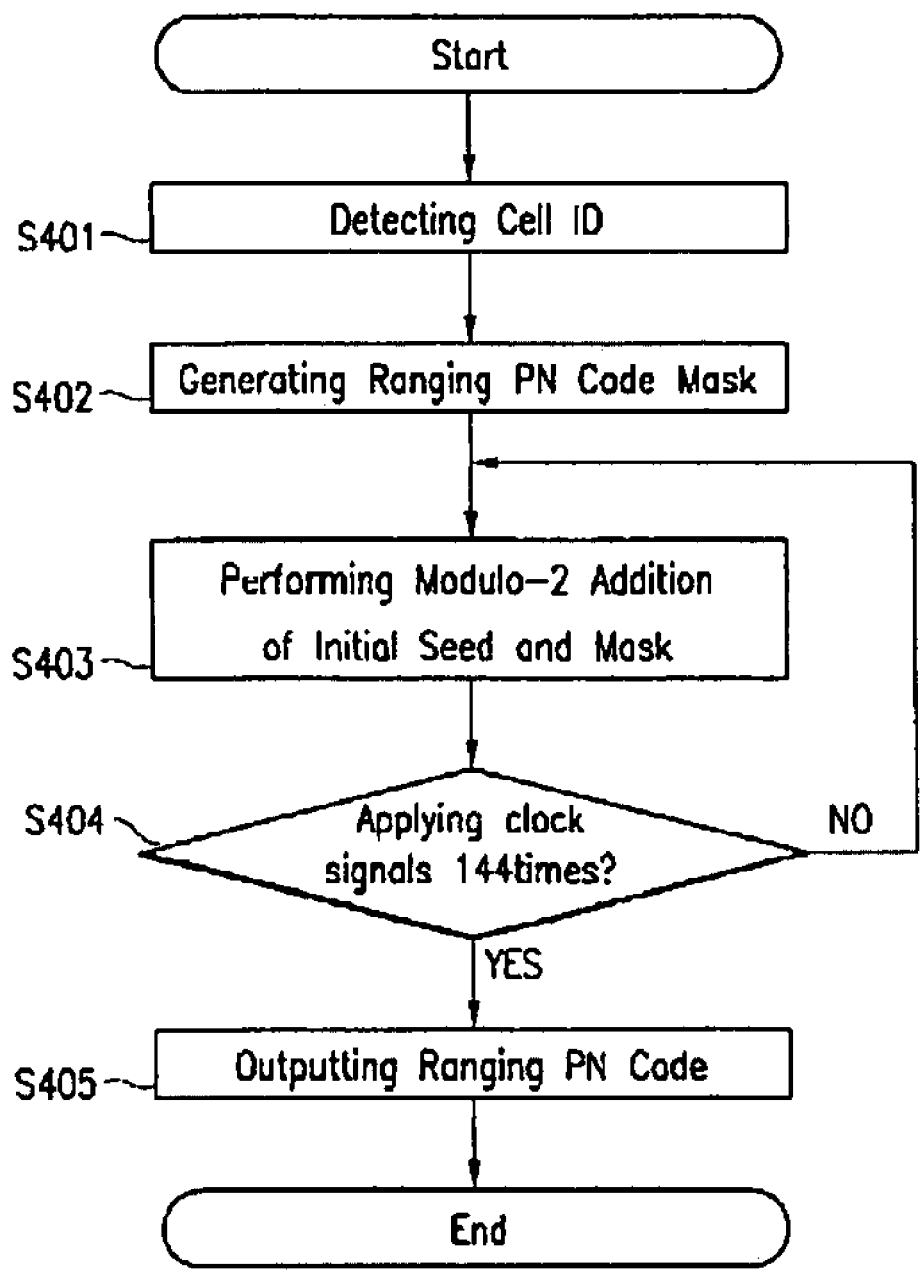
FIG. 4 is a flowchart showing a process for generating ranging PN codes according to an embodiment of the present invention.

FIG. 4 is a flowchart showing a process for generating ranging PN codes according to an embodiment of the present invention.

As shown in FIG. 4, the cell ID number search unit 210 detects the cell ID number using the preamble signal transmitted from the base station covering the cell ID number search unit 210 (S401).

The ranging PN code mask value generator 220 generates a 15-bit ranging PN code mask value using a 7-bit cell ID number detected from the cell ID number search unit 210 and system parameters input from the base station. In this case, the ranging PN code mask value generator 220 generates the ranging PN code mask value to have the offset value appropriate for the ranging modes through the cell ID number.

The ranging PN code generator 230 performs a modulo-2 addition for 15-bit initial value including the 7-bit cell ID number detected from the cell ID number search unit 210 and the 15-bit ranging PN code mask value generated from the ranging PN code mask value generator 220 thereby generating the final ranging PN code mask value. By applying 144-numbered clock signals, the 144-bit ranging PN code can be obtained as fast as possible so as to have the desired offset value appropriate for the ranging modes.

As described above, with the ranging PN code generator used for a terminal of a wireless portable Internet system of an OFDMA scheme according to the present invention, the PN code mask value can be generated using the cell ID number detected by the preamble signal transmitted from the base station and output of ranging PN codes can be obtained as fast as possible using an MSRG structured PN code generator so as to have an offset value appropriate for the ranging modes.

INDUSTRIAL APPLICABILITY

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for generating a ranging pseudo noise code used for a terminal of a portable internet system of an orthogonal frequency division multiple access scheme, comprising:
a cell ID number search unit for detecting a cell ID number of a base station covering the terminal through a preamble signal transmitted from the base station;
a ranging pseudo noise code mask value generator for generating a ranging pseudo noise code mask value depending on an offset value corresponding to a ranging mode by using the cell ID number detected by the cell ID number search unit and a system parameter provided by the base station; and
a ranging pseudo noise code generator for generating a ranging pseudo noise code by performing a modulo-2 addition for an initial value and the ranging pseudo noise code mask value, the initial value including the cell ID number and the system parameter,
wherein the ranging mode is selected among an initial ranging mode, a periodic ranging mode, a hand-off ranging mode, and a bandwidth request ranging mode, and
wherein the system parameter includes an offset value appropriate for the ranging mode.

2. The apparatus for generating a ranging pseudo noise code of claim 1, wherein the ranging pseudo noise code generator has a form of a modular shift register generator (MSRG).

3. The apparatus for generating a ranging pseudo noise code of claim 1, wherein the ranging pseudo noise code generator uses a constant initial value irregardless of the ranging mode.

4. The apparatus for generating a ranging pseudo noise code of claim 1, wherein the ranging pseudo noise code generator performs the modulo-2 addition for a 15-bit initial value including a 7-bit cell ID number and a 15-bit ranging pseudo noise code mask value and receives 144-numbered clock signals to generate the 144-bit ranging pseudo noise code.

5. The apparatus for generating a ranging pseudo noise code of claim 1, wherein the ranging pseudo noise code generator uses a following equation as a characteristic polynomial:

$$F(x)=x^{15}+x^{14}+x^{11}+x^{6}+1.$$

6. A method for generating a ranging pseudo noise code in a terminal of a portable internet system of an orthogonal frequency division multiple access scheme, comprising:
detecting a cell ID number using a preamble signal transmitted from a base station covering the terminal;
generating a ranging pseudo noise code mask value using the detected cell ID number and a system parameter input from the base station; and
performing a modulo-2 addition for an initial value and the ranging pseudo noise code mask value to generate a ranging pseudo noise code, the initial value including the cell ID number and the system parameter,
wherein the system parameter includes an offset value appropriate for a ranging mode, and the ranging pseudo noise code mask value is generated depending on the offset value corresponding to the ranging mode, and
wherein the ranging mode is selected among an initial ranging mode, a periodic ranging mode, a hand-off ranging mode, and a bandwidth request ranging mode.

7. The method for generating a ranging pseudo noise code of claim 6,
wherein the initial value is given as 15-bit including the 7-bit cell ID number as the low-order 7 bits.

8. The method for generating a ranging pseudo noise code of claim 6, wherein 144-numbered clock signals are applied for the ranging pseudo noise code to generate a 144-bit ranging pseudo noise code.

* * * * *